US007924285B2

(12) United States Patent
Brown et al.

(10) Patent No.: US 7,924,285 B2
(45) Date of Patent: Apr. 12, 2011

(54) EXPOSING VARIOUS LEVELS OF TEXT GRANULARITY FOR ANIMATION AND OTHER EFFECTS

(75) Inventors: David C. Brown, Redmond, WA (US); Worachai Chaoweeraprasit, Redmond, WA (US); Zhanjia Yang, Redmond, WA (US)

(73) Assignee: Microsoft Corporation, Redmond, WA (US)

( * ) Notice: Subject to any disclaimer, the term of this patent is extended or adjusted under 35 U.S.C. 154(b) by 231 days.

(21) Appl. No.: 11/101,048

(22) Filed: Apr. 6, 2005

(65) Prior Publication Data

US 2006/0227142 A1    Oct. 12, 2006

(51) Int. Cl.
G06T 15/70    (2006.01)

(52) U.S. Cl. ........ 345/473; 345/474; 345/467; 345/619; 701/117; 705/14; 707/9; 707/206; 715/513; 715/517; 715/529; 715/530; 715/726

(58) Field of Classification Search .................. 345/473, 345/474, 467, 619; 701/117; 705/14; 707/9, 707/206
See application file for complete search history.

(56) References Cited

U.S. PATENT DOCUMENTS

| | | | | |
|---|---|---|---|---|
| 5,455,941 A | * | 10/1995 | Okuno et al. | 707/9 |
| 5,617,115 A | * | 4/1997 | Itoh et al. | 345/467 |
| 6,057,833 A | * | 5/2000 | Heidmann et al. | 715/726 |
| 6,091,505 A | * | 7/2000 | Beaman et al. | 358/1.11 |
| 6,504,545 B1 | * | 1/2003 | Browne et al. | 345/473 |
| 6,512,522 B1 | * | 1/2003 | Miller et al. | 345/474 |
| 6,856,318 B1 | * | 2/2005 | Lewak | 345/473 |
| 6,956,574 B1 | * | 10/2005 | Cailloux et al. | 345/473 |
| 7,009,611 B2 | * | 3/2006 | Di Lelle | 345/467 |
| 7,028,260 B1 | * | 4/2006 | Morsello | 715/210 |
| 7,126,606 B2 | * | 10/2006 | Beda et al. | 345/473 |
| 7,167,180 B1 | * | 1/2007 | Shibolet | 345/474 |
| 7,453,464 B1 | * | 11/2008 | Acquavella | 345/474 |
| 2001/0035865 A1 | * | 11/2001 | Utterback et al. | 345/474 |
| 2003/0110450 A1 | * | 6/2003 | Sakai | 715/529 |
| 2003/0121008 A1 | * | 6/2003 | Tischer | 715/530 |
| 2004/0123243 A1 | * | 6/2004 | Everett | 715/517 |
| 2004/0143385 A1 | * | 7/2004 | Smyth et al. | 701/117 |
| 2004/0268235 A1 | * | 12/2004 | Wason | 715/513 |
| 2005/0144072 A1 | * | 6/2005 | Perkowski et al. | 705/14 |
| 2006/0129921 A1 | * | 6/2006 | Relyea et al. | 715/524 |
| 2006/0221081 A1 | * | 10/2006 | Cohen et al. | 345/473 |
| 2006/0253508 A1 | * | 11/2006 | Colton et al. | 707/206 |
| 2006/0256130 A1 | * | 11/2006 | Gonzalez | 345/619 |
| 2007/0168060 A1 | * | 7/2007 | Nixon et al. | 700/83 |

OTHER PUBLICATIONS

Foley, James D.; van Dam, Andries; Feiner, Steven k.; Hughes, John F.; "Computer Graphics Principles and Practice;" 1996, Addison-Wesley Publishing Company; Second Edition; pp. 550-557.*

* cited by examiner

*Primary Examiner* — Kimbinh T Nguyen
(74) *Attorney, Agent, or Firm* — Workman Nydegger (57) ABSTRACT

Described is a system and method by which text elements to be rendered on a computer display (e.g., paragraph, line or any subset of text including a character or glyph) may be individually or collectively animated, at an author-selected level of granularity. Animation of text may be specified by setting animation properties via direct coding (e.g., in markup) or by specifying animation code to execute on text-related data, just prior to rendering. The text to animate may be static, or dynamically obtained at runtime from an external source. The text to animate is maintained as a whole with other text of the same element, in a text object, until a processing level that produces separate glyph runs, with an animation transform associated with each glyph run to be animated. Also described is an API that supports text animation.

12 Claims, 5 Drawing Sheets

EXPOSING VARIOUS LEVELS OF TEXT GRANULARITY FOR ANIMATION AND OTHER EFFECTS

COPYRIGHT DISCLAIMER

A portion of the disclosure of this patent document contains material that is subject to copyright protection. The copyright owner has no objection to the facsimile reproduction by anyone of the patent document or the patent disclosure as it appears in the Patent and Trademark Office patent file or records, but otherwise reserves all copyright rights whatsoever.

FIELD OF THE INVENTION

The invention relates generally to computer systems, and more particularly to rendering text and other images on computer display screens.

BACKGROUND

In contemporary computing systems, the development of markup language technology has resulted in a straightforward way for program authors to provide valuable information to users, and to receive requests and the like corresponding to user interaction with the displayed information. In general, the markup is processed to construct an element tree, and then the element tree is processed for rendering corresponding output data onto a display.

U.S. patent application Ser. Nos. 10/693,630 and 10/693,822 are among several patent applications (assigned to the assignee of the present invention) that, among other things, describe one such markup language that is generally arranged to simplify program authoring, namely XAML (eXtensible Application Markup Language). In general, a program author uses XAML instructions along with calls to application programming interfaces (APIs) to place objects in a scene graph data structure. For example, to build a user interface, a XAML-based program generally adds child visual objects to other visual objects to build up a hierarchical scene graph, writes instruction lists such as geometry data, image data and other data for output, and may specify transform, clipping and opacity properties on visual objects.

One of the capabilities of XAML described in the aforementioned patent applications is the ability to allow programs to specify animation parameters and/or media-related data, and then efficiently output corresponding display data that includes corresponding animations and/or media. A program author may describe a desired animation effect in terms of parameters, such as how much some displayed object property should change over time; for example, a rectangle's opacity property may be set to gradually fade from opaque to transparent, and then back, over some duration. In typical situations, the system manages the animation so that the program code need only specify the animation parameters initially, rather than requiring the program code itself to regularly redraw a changed image over time to accomplish the effect.

However, present development platforms only allow text to be animated on a coarse level. For example, a straightforward animation is able to make a given word spin in place, but making individual characters spin in place separately was not something that heretofore could be easily accomplished. This may be done by treating each character as a separate entity, however this was tedious and very limiting as to the scenarios in which animations and other text effects can be applied. As one major limitation, the author had to have prior knowledge of the exact text; for example, it was heretofore not possible to dynamically receive a news feed during runtime and animate each character of an article's title.

Moreover, previous systems have required an explicit specification of the origin of each animation. As a result, when each character is given a separate animation, the author of the animation was required to work out an at-rest position. This is extremely difficult to do, essentially limiting authors to use monospace fonts for per-character animations. This was heretofore also impossible when the when the exact text was not known beforehand, that is, when the data to be animated is substituted at run time.

SUMMARY OF THE INVENTION

Briefly, the present invention is directed towards a system and method by which text elements can be individually animated, at an author-selected level of granularity, including glyph-level animation. For example, a paragraph, line or any subset of text including a character or glyph can have an animation property applied to it, whereby the element will change in some way over time.

Animation may be accomplished in various ways, including by direct coding in markup or another language, or by applying animation code to text-related data at runtime. Moreover, the text-related data may be dynamically obtained at runtime, whereby the author need not know the exact text to animate in advance, and can specify animation to occur regardless of what the text actually is.

To this end, the application of an animation transform is performed at the glyph level, wherein in general, when text is to be rendered, the text ends up as data in at least one glyph run. The text to be animated, contained in a text object having an associated animation property, is separated into one glyph run, with other text (which may be non-animated, or animated in some other way) in one or more other glyph runs. An animation transform is applied to the glyph run that corresponds to the text to animate. Types of transforms that can be used to animate text include those related to movement, such as rotation, shear, scale factor, and translation in any direction), transforms that clip a region (to show part of a character, color (brush) transforms, and opacity transforms. When rendered, the animation is applied, changing the appearance of the image generated from the glyph run in some way over time.

Because the text may be dynamically obtained from a source external to the authored code, the present invention defers application of the animation transform to the glyph runs, which occurs after text layout, thereby allowing substituted text to be animated, such as text dynamically obtained and substituted by databinding or localization. The text to animate is maintained as a whole with other text of the same element, in a text object, until the glyph run production level, which is after databinding and layout, but before rendering. A property set of the text object is used to contain the animation information.

In one implementation, the author may specify the text (directly and/or via a source of the text) to animate, and the text effect property, such as in XAML or other high-level code. The property set may include text effect code (e.g., via a filename) and controlling parameters. When specified, the text effect code is called during glyph production to inspect the layout, separate the text into glyph runs as necessary, and apply animation transforms.

A property also may be specified at a lower-level, such as for per character or glyph animation. Also provided is an API that supports text animation.

Other advantages will become apparent from the following detailed description when taken in conjunction with the drawings, in which:

DETAILED DESCRIPTION

Exemplary Operating Environment

Figure 1:
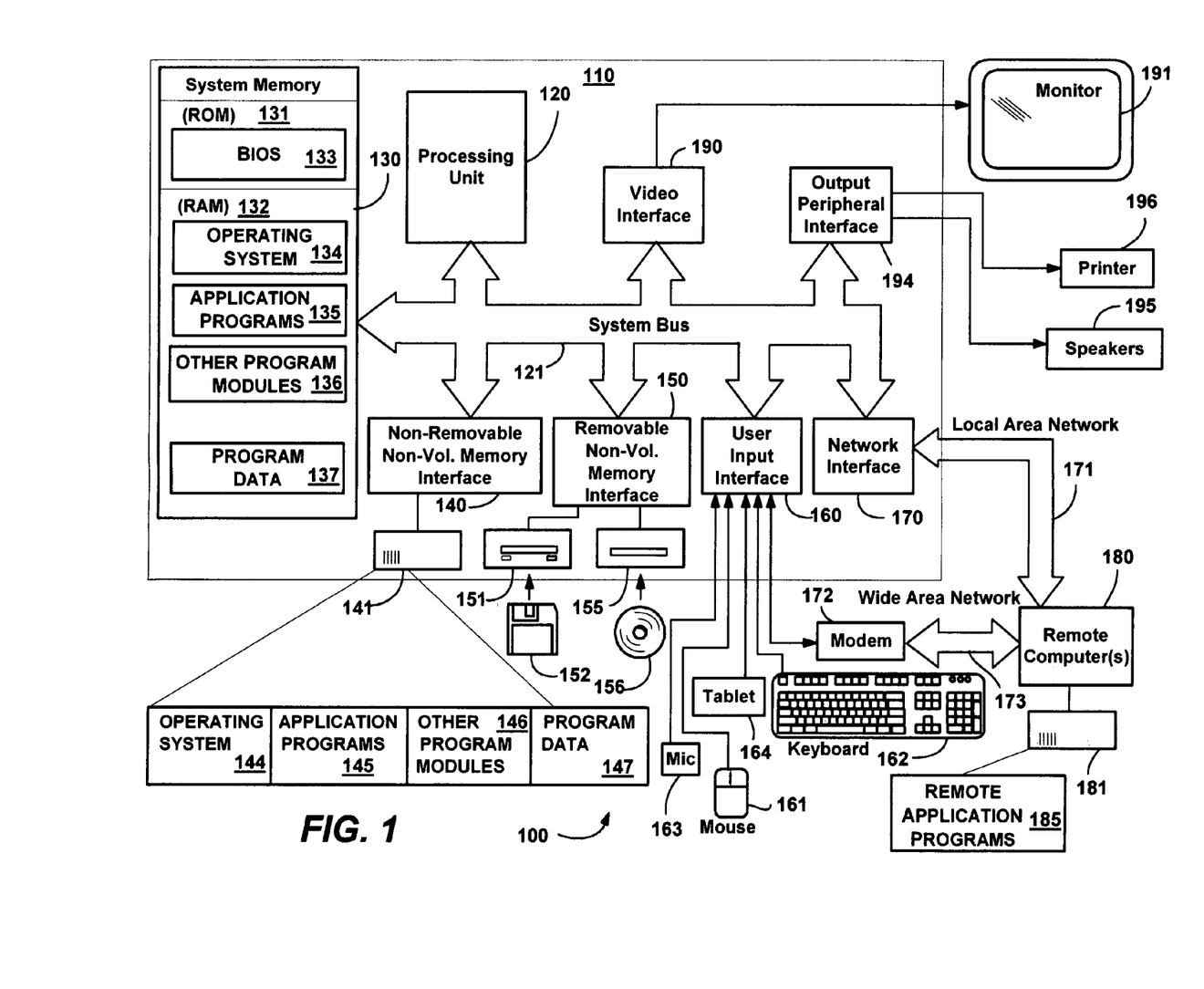
FIG. 1 is a block diagram generally representing a computing environment into which the present invention may be incorporated.

FIG. 1 illustrates an example of a suitable computing system environment 100 on which the invention may be implemented. The computing system environment 100 is only one example of a suitable computing environment and is not intended to suggest any limitation as to the scope of use or functionality of the invention. Neither should the computing environment 100 be interpreted as having any dependency or requirement relating to any one or combination of components illustrated in the exemplary operating environment 100.

The invention is operational with numerous other general purpose or special purpose computing system environments or configurations. Examples of well known computing systems, environments, and/or configurations that may be suitable for use with the invention include, but are not limited to: personal computers, server computers, hand-held or laptop devices, tablet devices, multiprocessor systems, microprocessor-based systems, set top boxes, programmable consumer electronics, network PCs, minicomputers, mainframe computers, distributed computing environments that include any of the above systems or devices, and the like.

The invention may be described in the general context of computer-executable instructions, such as program modules, being executed by a computer. Generally, program modules include routines, programs, objects, components, data structures, and so forth, which perform particular tasks or implement particular abstract data types. The invention may also be practiced in distributed computing environments where tasks are performed by remote processing devices that are linked through a communications network. In a distributed computing environment, program modules may be located in local and/or remote computer storage media including memory storage devices.

With reference to FIG. 1, an exemplary system for implementing the invention includes a general purpose computing device in the form of a computer 110. Components of the computer 110 may include, but are not limited to, a processing unit 120, a system memory 130, and a system bus 121 that couples various system components including the system memory to the processing unit 120. The system bus 121 may be any of several types of bus structures including a memory bus or memory controller, a peripheral bus, and a local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus also known as Mezzanine bus.

The computer 110 typically includes a variety of computer-readable media. Computer-readable media can be any available media that can be accessed by the computer 110 and includes both volatile and nonvolatile media, and removable and non-removable media. By way of example, and not limitation, computer-readable media may comprise computer storage media and communication media. Computer storage media includes volatile and nonvolatile, removable and non-removable media implemented in any method or technology for storage of information such as computer-readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can accessed by the computer 110. Communication media typically embodies computer-readable instructions, data structures, program modules or other data in a modulated data signal such as a carrier wave or other transport mechanism and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. Combinations of the any of the above should also be included within the scope of computer-readable media.

The system memory 130 includes computer storage media in the form of volatile and/or nonvolatile memory such as read only memory (ROM) 131 and random access memory (RAM) 132. A basic input/output system 133 (BIOS), containing the basic routines that help to transfer information between elements within computer 110, such as during start-up, is typically stored in ROM 131. RAM 132 typically contains data and/or program modules that are immediately accessible to and/or presently being operated on by processing unit 120. By way of example, and not limitation, FIG. 1 illustrates operating system 134, application programs 135, other program modules 136 and program data 137.

The computer 110 may also include other removable/non-removable, volatile/nonvolatile computer storage media. By way of example only, FIG. 1 illustrates a hard disk drive 141 that reads from or writes to non-removable, nonvolatile magnetic media, a magnetic disk drive 151 that reads from or writes to a removable, nonvolatile magnetic disk 152, and an optical disk drive 155 that reads from or writes to a removable, nonvolatile optical disk 156 such as a CD ROM or other optical media. Other removable/non-removable, volatile/nonvolatile computer storage media that can be used in the exemplary operating environment include, but are not limited to, magnetic tape cassettes, flash memory cards, digital versatile disks, digital video tape, solid state RAM, solid state ROM, and the like. The hard disk drive 141 is typically connected to the system bus 121 through a non-removable memory interface such as interface 140, and magnetic disk drive 151 and optical disk drive 155 are typically connected to the system bus 121 by a removable memory interface, such as interface 150.

The drives and their associated computer storage media, described above and illustrated in FIG. 1, provide storage of computer-readable instructions, data structures, program modules and other data for the computer 110. In FIG. 1, for example, hard disk drive 141 is illustrated as storing operating system 144, application programs 145, other program modules 146 and program data 147. Note that these components can either be the same as or different from operating system 134, application programs 135, other program modules 136, and program data 137. Operating system 144, application programs 145, other program modules 146, and program data 147 are given different numbers herein to illustrate that, at a minimum, they are different copies. A user may enter commands and information into the computer 110 through input devices such as a tablet, or electronic digitizer, 164, a microphone 163, a keyboard 162 and pointing device 161, commonly referred to as mouse, trackball or touch pad. Other input devices not shown in FIG. 1 may include a joystick, game pad, satellite dish, scanner, or the like. These and other input devices are often connected to the processing unit 120 through a user input interface 160 that is coupled to the system bus, but may be connected by other interface and bus structures, such as a parallel port, game port or a universal serial bus (USB). A monitor 191 or other type of display device is also connected to the system bus 121 via an interface, such as a video interface 190. The monitor 191 may also be integrated with a touch-screen panel or the like. Note that the monitor and/or touch screen panel can be physically coupled to a housing in which the computing device 110 is incorporated, such as in a tablet-type personal computer. In addition, computers such as the computing device 110 may also include other peripheral output devices such as speakers 195 and printer 196, which may be connected through an output peripheral interface 194 or the like.

The computer 110 may operate in a networked environment using logical connections to one or more remote computers, such as a remote computer 180. The remote computer 180 may be a personal computer, a server, a router, a network PC, a peer device or other common network node, and typically includes many or all of the elements described above relative to the computer 110, although only a memory storage device 181 has been illustrated in FIG. 1. The logical connections depicted in FIG. 1 include a local area network (LAN) 171 and a wide area network (WAN) 173, but may also include other networks. Such networking environments are commonplace in offices, enterprise-wide computer networks, intranets and the Internet.

When used in a LAN networking environment, the computer 110 is connected to the LAN 171 through a network interface or adapter 170. When used in a WAN networking environment, the computer 110 typically includes a modem 172 or other means for establishing communications over the WAN 173, such as the Internet. The modem 172, which may be internal or external, may be connected to the system bus 121 via the user input interface 160 or other appropriate mechanism. In a networked environment, program modules depicted relative to the computer 110, or portions thereof, may be stored in the remote memory storage device. By way of example, and not limitation, FIG. 1 illustrates remote application programs 185 as residing on memory device 181.

It will be appreciated that the network connections shown are exemplary and other means of establishing a communications link between the computers may be used.

Example Layered Architecture

Figure 2:
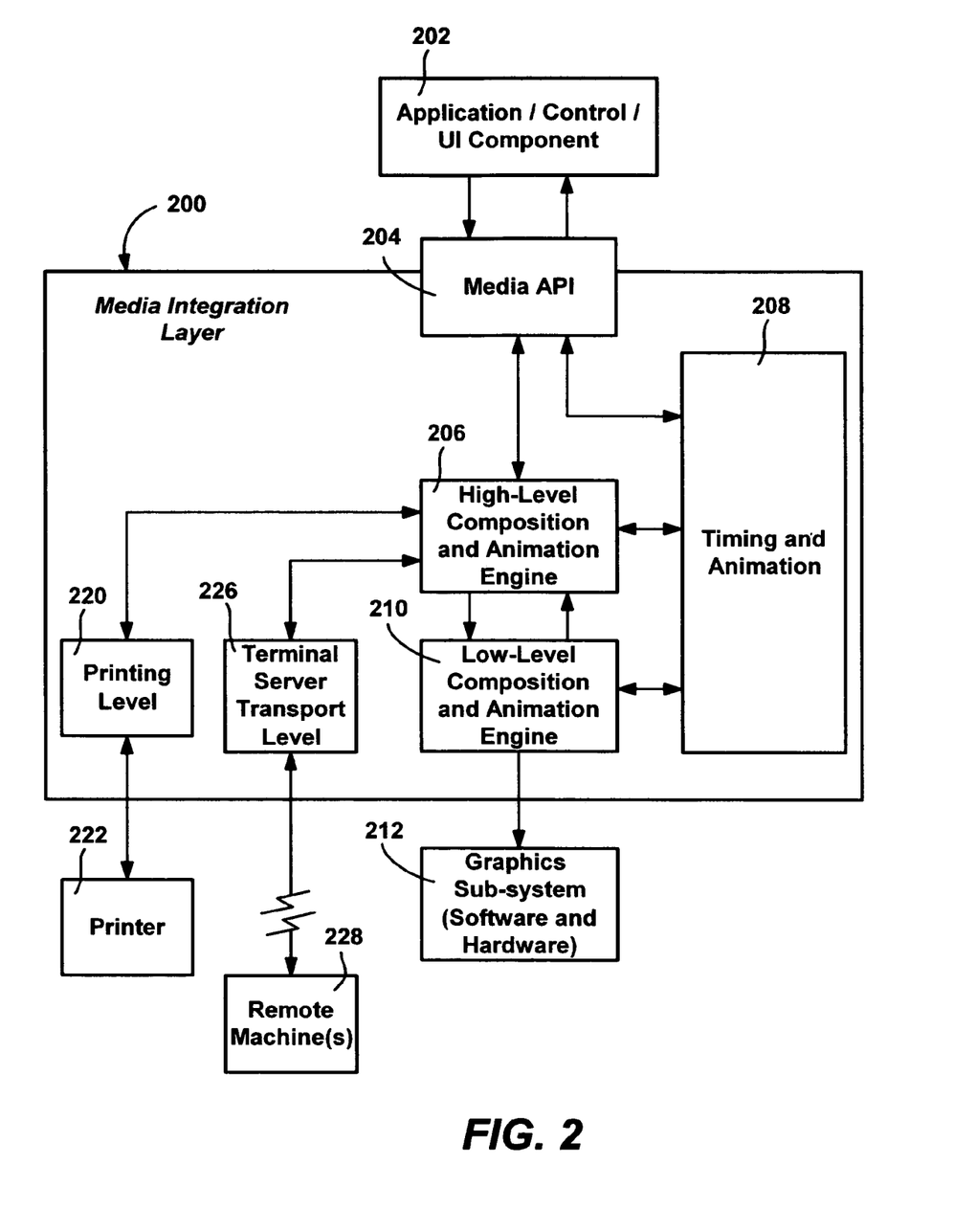
FIG. 2 is a block diagram representing a media integration layer architecture in accordance with various aspects of the present invention.

One aspect of the present invention is based upon the ability to leverage a smooth, complex animation mechanism that may be loaded onto computer systems. One such mechanism, as generally represented in FIG. 2, is incorporated into a media integration layer architecture 200. An application program, control or other similar higher-level program code (e.g., a user interface of an operating system component) 202 accesses the media integration layer architecture 200 via a set of application programming interfaces (APIs) 204 or the like, to access (write or read) graphical information. Note that although many of the examples described herein will refer to an application program interfacing with the APIs, it is understood that other higher-level program code and components (e.g., a user interface of the operating system) will also be able to interface with the lower-level components described herein. As such, any reference to such higher-level program code, whether referred to as an application program, user interface, and so on, should be considered equivalent.

In one implementation, the media integration layer architecture 200 includes a high-level composition and animation engine 206, timing and animation components 208, and a low-level compositing and animation engine 210. As used herein, the terms "high-level" and "low-level" are similar to those used in other computing scenarios, wherein in general, the lower a software component relative to higher components, the closer the component is to the hardware. Thus, for example, graphics information sent from the high-level composition and animation engine 206 may be received at the low-level compositing and animation engine 210, where the information is used to send graphics data to the graphics subsystem including the hardware.

In general, the high-level composition and animation engine (also referred to as the high-level compositor and animator or the high-level engine or component) 206 builds a display element tree to represent a graphics scene provided by the application program 202, while the timing and animation components provide declarative (or other) animation and timing control. The low-level compositing and animation engine (also referred to as the low-level compositor and animator or low-level engine or component) 210 composes the renderings for the scenes of multiple applications, and with rendering components, implements the actual rendering of graphics to the screen. Note, that it is still possible to do time-consuming or application-specific rendering at higher levels, and pass references to a bitmap or the like to the lower layers.

The high-level composition and animation engine 206 builds the element tree structure and traverses the structure, creating rendering instructions and simple animation intervals to be passed to the low-level compositing and animation engine 210. The rendering instructions generated by the high-level compositor may contain timing and animation information. The low-level compositing and animation engine 210 takes the rendering instructions and animation intervals and manages the animating, rendering and composing the scene that is then provided to the graphics subsystem (e.g., the graphics software and hardware) 212. Alternatively or in addition to locally displayed output, the high-level composition and animation engine 206 (or one similar thereto) may provide the rendering and animation instructions in an appropriate format to lower-level printing code 220 for sending fixed image data to a printer 222 or the like, and/or may provide rendering instructions and simple animation intervals in an appropriate format to a lower-level terminal transport server 226 for transmission to remote machines 228.

In this example implementation, the media integration layer architecture 200 thus separates graphics processing into multiple levels, and each of these levels performs some intelligent graphics processing which together allows applications' user interfaces and the like 202 to output text and graphics with smooth animation, composite the graphics with the graphics of other applications, and work with video frames.

Figure 3:
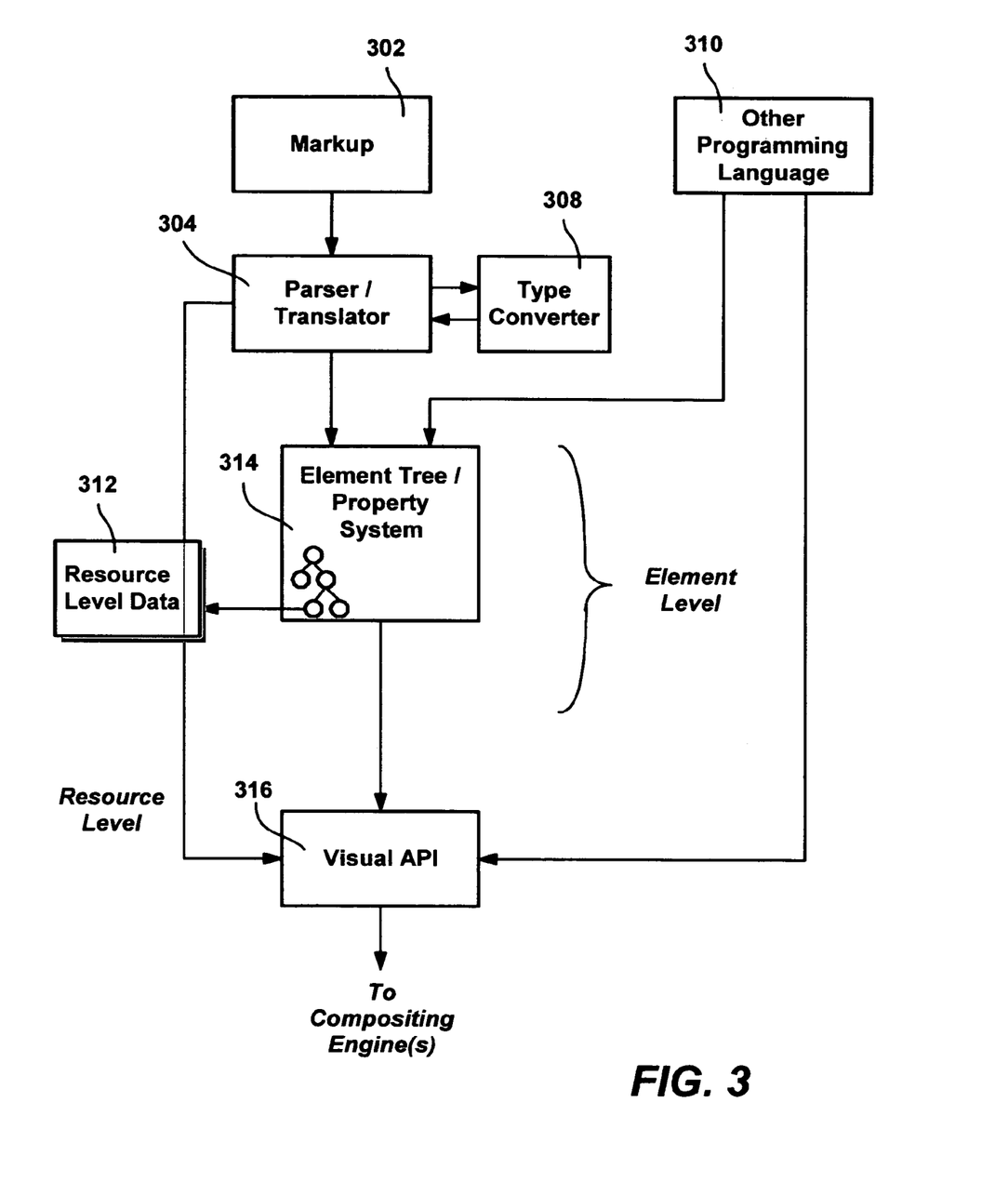
FIG. 3 is a representation of components for interpreting markup language code to interface with the visual API layer, in accordance with various aspects of the present invention.

FIG. 3 represents one implementation in which markup code 302 such as XAML-based code may be interpreted by a parser/translator 304. In general, the parser/translator 304 adds elements to the element tree/property system 314; the elements are visual objects that do their own layout. Further, note that some or all of the markup code may be compiled rather than interpreted on demand, thereby improving efficiency.

In general, an element is an object in the element layer that participates in the property system, triggering and layout/presentation system. The parser 304 finds tags and decides if those tags help to define an element or a resource object. In the special case of a VisualBrush, for example, the same tags may be interpreted as elements or also interpreted as resource objects, depending on the context of where those tags appear, e.g., depending on whether appearing in complex property syntax or not, as described in U.S. patent application Ser. No. 10/401,717.

In addition to being present inline in the markup, a resource instance may be located elsewhere (e.g., in the markup or in a file, which can be local or on a remote network and appropriately downloaded), and referenced by a name, (e.g., a text name, reference or other suitable identifier). In this manner, a scene designer can reuse an element in the element tree throughout a scene, including elements described by the complex property syntax.

The parser 304 handles markup in the complex property syntax by accessing the type converter 308 as necessary, and also by matching specified parameters to the object properties, thereby handling the complexity for the scene designer (author). Thus, the parser 304 does not just set up the objects, but also sets properties on the objects. Because the same rendering model is shared between the element level and the API level, many of the objects are essentially the same. This makes parsing/translation highly efficient, and also allows different types of programming languages (e.g., C#-like languages) the ability to easily convert from the markup to its own syntax, and vice-versa. Note that as represented in FIG. 3, another such programming language 310 (which may comprise compiled markup) can add elements to the element tree 314, or can directly interface with the visual API layer 316.

As also represented in FIG. 3, the same markup 302 may be used to program at an element level and a resource level. In general, the element level gives the scene designer full programmability, usage of the property system that provides inheritance (e.g., style-sheet like features), and triggering (e.g., whereby an element may have attached code to change its appearance, position and so forth in response to a user input event or action). However, the present invention also provides a resource-level mechanism by which scene designers can essentially shortcut the element tree and program directly to the visual API layer. For many types of static shapes, images and the like where element-level features are not needed, this provides a more efficient and lightweight way to output the appropriate object.

In general, animation is accomplished by both the high-level compositor and animation engine 206 and the low-level compositor and animation engine 210. In one implementation, the high-level engine 206 traverses the scene and updates animation parameters with intervals for later interpolation, and packages these simplified data structures into instructions that get passed to the lower-level engine 210. This may be done in a synchronous and/or asynchronous manner. The interval data can be considered as including the timing endpoints (start and end timing data), as well as the parameterized values for the rendering instruction. Note that the high-level engine 204 can perform some or all of a requested interpolation, e.g., if an interpolation or other motion function is too complex for the lower-level engine 210 to handle, or the lower-level cannot keep up with the processing demands placed thereon, the higher-level engine can perform some or all of the calculations and provide the lower-level with simplified data, instructions, tessellations, and so on to accomplish the desired result.

In a typical case when the lower level does perform interpolations, for each frame of animation, the low-level engine 210 interpolates the parameter intervals to obtain instantaneous values, and decodes the instructions into rendering commands executed by the graphics device. The graphics device composes the final scene adding any video frames that might be present in the scene. Other data also may be added, such as content protected by digital rights management.

The high-level engine 206 thus traverses the scene data-structures, computes an interval describing each animated parameter for a period of time, and passes these intervals and simplified parameterized drawing instructions to the low-level engine 210. The parameter data includes start time, end time, interpolator and interpolation data. By way of example, instead of erasing and redrawing an image so that it appears to move, the high-level compositor and animation engine 206 can instruct the low-level compositor and animation engine 210 as to how the image should change over time, e.g., starting coordinates, ending coordinates, the amount of time (interval) that the image should move between the coordinates, and a motion function such as linear; (note that motion is not required for animation, as a stationary object may be animated by changing its color property, for example). The low-level compositor and animation engine 210 will interpolate to determine new positions between frames, convert these into drawing instructions that the graphics device can understand, and pass the commands to the graphics device. Each pass of the high-level engine 206 preferably provides sufficient data for the low-level engine 210 to perform smooth animation over several frames.

The low-level (e.g., fast-tick) engine 210 is a separate task from the high-level engine 206. The low-level engine 210 receives the simplified parameterized drawing instructions and parameter intervals describing the scene from the high-level engine 206. The low-level engine maintains and traverses these data structures until new ones are provided by the high-level engine 206. The low-level engine may service multiple high-level engines 206, maintaining separate data structures for each. The one-to-many relationship between the low-level engine 210 and high-level engine 206 allows the system to smoothly animate multiple scenes simultaneously.

The low-level engine 210 interpolates essentially instantaneous animation parameters based on the high-level engine's provided intervals, updates drawing instructions and renders the scene for every frame. The low-level engine 210 task runs at a high priority on the system, to ensure that frames are ready for presentation such as at the graphics hardware screen refresh rate. The interpolations performed by the low-level engine 210 are thus typically limited to simple, fast functions such as linear, piecewise linear, cubic spline and those of similar speed.

Text Animation and Other Effects

The present invention is generally directed towards a system and method by which text elements can be individually animated, at an author-selected level of granularity, including glyph-level animation. For example, a paragraph, line or any subset of text including a character or glyph can have an animation property applied to it, whereby the element will change in some way over time. As will be understood, this may be accomplished in various ways, including by direct coding in markup or another language, or by binding animation code to text-related data at runtime.

As will be understood, numerous ways to implement the present invention are feasible, and only some of the alternatives are described herein. For example, although the various examples herein are generally directed towards specifying animation effects in a markup language, the present invention is not limited to markup, but rather animation effects may be specified in another language, such as C# and the like. Further, the present invention is not limited to the above-described media integration layer, but may be used on other types of animation-capable architectures. As such, the present invention is not limited to any particular examples used herein, but rather may be used various ways that provide benefits and advantages in computing in general.

In accordance with various aspects of the present invention, a program author has the ability to specify animation on text in a number of ways. One such way is to directly specify animation parameters on static text. As described below, one implementation of the present invention uses text layout and generic animation effects built into the above-described layered architecture. This implementation allows users to specify animations on a more granular level (in the following example, the character level) through XAML markup or code, using a tag to reference a TextEffect object:

```
<Text>
    <Text.TextEffects>
        <TextEffect CharacterIndex = "0" Count="1">
            <TextEffect.Transform>
                <TranslateTransform>
                    <TranslateTransform.Y>
                        <DoubleAnimation
IsAdditive="True" Duration="10" RepeatBehavior="Forever"
From="-20" To="20"/>
                    </TranslateTransform.Y>
                </TranslateTransform>
            </TextEffect.Transform>
        </TextEffect>
    </Text.TextEffects>
        Hello
</Text>
```

In this particular example, the XAML markup specifies a text effect on the first character of a string ("Hello") by setting the starting offset to zero (0) and the character count to one (1). As can be readily appreciated, the effect can start at another character in the string, and extend to more than one character. Moreover, different text effects may be put on the same string, e.g., to spin one character, and move another.

As can also be understood from this example, the text effect that the author has specified is a translation transform with animation parameters that repeatedly change the y-coordinate of the specified character ('H') over time, thereby making the first letter 'H' move up and down.

Figure 4:
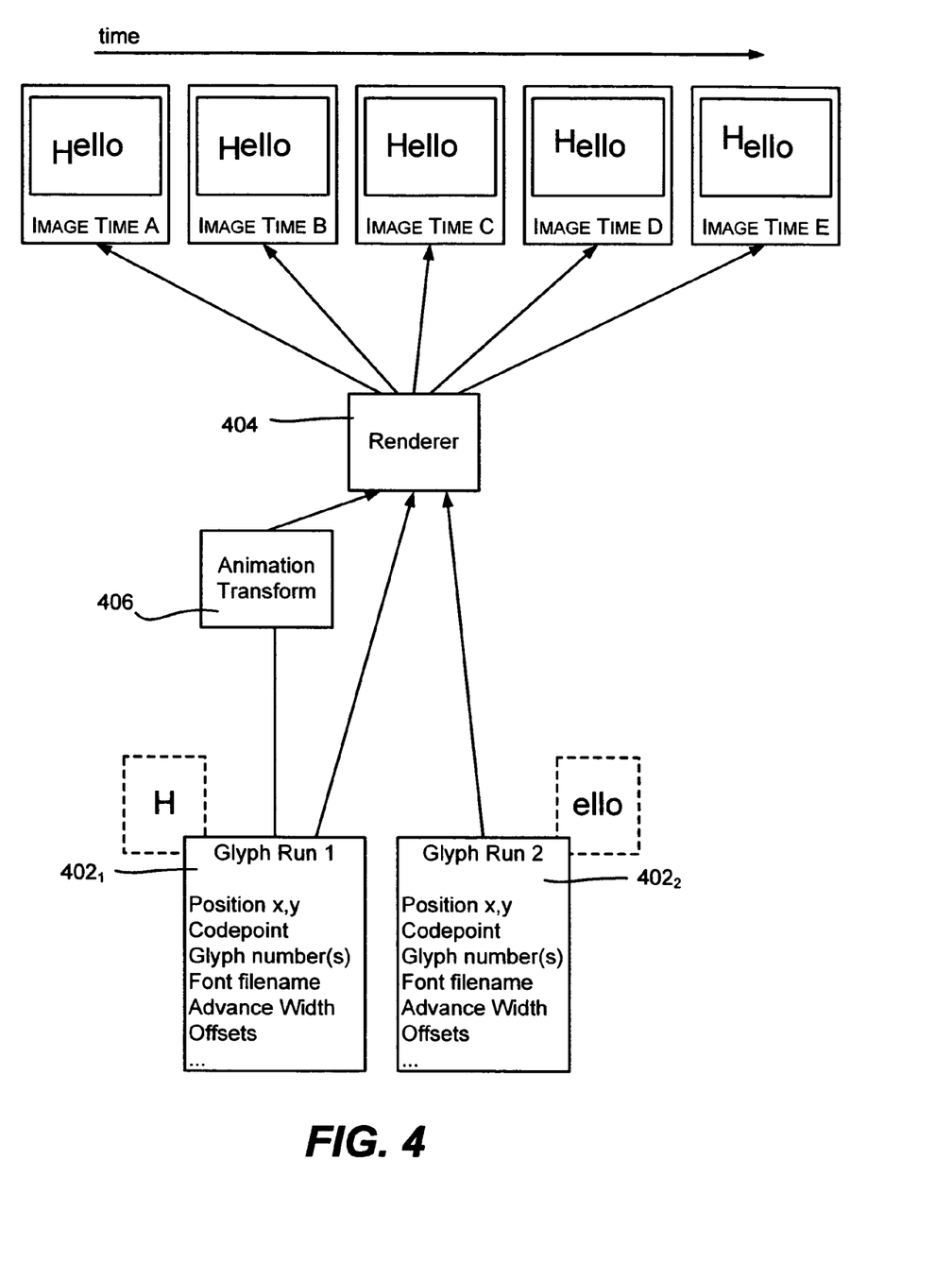
FIG. 4 is a block diagram representing glyph runs, including one that is animated such that when rendered, a corresponding character image changes over time, in accordance with various aspects of the present invention.

As represented in FIG. 4, the application of the transform is accomplished at the glyph level, as also described below with reference to FIG. 5. In general, when text is to be rendered, the text ends up as data in at least one glyph run (e.g., $402_1$-$402_2$), which will then be used by a rendering component 404 to render the text output. Each glyph run contains information from various sources, including the font file that is in use, positioning information, and so forth. Absent animation or other effects there ordinarily would be one glyph run for the "Hello" string.

To animate individual parts of a glyph run such as the letter 'H' of the string, at the glyph run production level, separate glyph runs ($402_1$-$402_2$ in the example of FIG. 4) are produced as necessary. Note that it is possible to have a glyph run for each character or glyph, however since in the current example only one character is being animated, for efficiency the other characters of the string are combined into a single glyph run.

Then, as described below, an animation transform 406 is applied to the glyph run $402_1$ to be animated. Types of transforms that can be used to animate text include those related to movement, such as rotation, shear, scale factor, and translation in any direction, transforms that clip a region to show part of a character, color (brush) transforms, and opacity transforms. As can be readily appreciated, different animation transforms may be applied to different glyph runs, so that, for example, the "ello" part of the text may spin if a rotation transform was applied to the "ello" glyph run $402_2$. Also, different animation transforms may be applied to a single glyph run, e.g., one to change the coordinates, another to change the opacity, and so forth When rendered, the animation is applied, e.g., via the architecture described with reference to FIGS. 2 and 3, changing the appearance of the image generated from the glyph run in some way over time. In the example of FIG. 4, the 'H' character moves up and down over time; the upward movement of the 'H' is represented in "images" in FIG. 4 at various times A-E. Note that these images are for purposes of illustration of the upward movement in general, and are not intended to be exact in size, coordinate values, and so forth, nor are the image times A-E intended to represent any particular rate and/or timing function.

When layout is simple, such as in FIG. 4's example of a single short line of text, with the exact text known at authoring time (requiring no localization or dynamic databinding), an authoring tool can determine accurate animation details at authoring time. In such a situation, the character/glyph properties described above may be set directly in the markup by such an authoring tool.

However, the animation details often cannot be calculated until viewing time. As one example, the layout may be more complex, such as when line layout or page layout is required at document viewing time; the distribution of animations (or other effects) across characters, glyphs, or any other sub-paragraph-level text atomicity cannot be completed until physical layout is known. As another example, the text to animate is often not known until viewing time, such as when the text is dynamically obtained and substituted by databinding or localization. In such situations, the animation calculation must be encapsulated in a text animation effect that runs to set its calculated animations on the text after databinding and layout, but before rendering.

In accordance with an aspect of the present invention, for such dynamic situations, the text effect API that implements the present invention essentially runs just before rendering, after any data binding and paragraph layout has occurred. In this manner, the content that is to be animated may be obtained from sources external to the authored code, and various layout mechanism that lay out the content based on window size and other factors may perform their actions before any animations applied. As a result, content that is not known in advance to the author, such as text downloaded at runtime or text retrieved from a database at runtime can be animated. Taking the example in the background section, via the present invention it is now possible to dynamically receive a news feed during runtime, and animate each character of an article's title as desired.

Moreover, the author need not directly specify complex animation parameters in the markup, but may reference an animation code file that performs the necessary work. For example, consider an author that wants to set animations that apply a real-world animation effect and distribute it at some granularity across the characters or glyphs of multiple runs of text, such as to have characters appear as if on springs, wobbling and/or bouncing to provide a jittering effect. While the author may include the necessary parameters in the markup, the author may instead reference a "springs" file that is called at runtime to apply the animation parameters. Such a file may have its own parameters that the author can set to control the effect, e.g., amount of vertical bounce and horizontal sway, general speed, amount of randomness and so forth, but the author need not deal with the actual angles and other formulas that provide the exact animation data, because the program handles this for caller that uses it. Similar programs for fly-in effects, rolling effects and so forth may be used. As a result, authoring tools may simply reference such a file to obtain preconfigured animation effect capabilities.

The text animation effect runs at a time when the page and line layout has been finalized, and when data binding is complete. Thus the text animation effect code has access to all the information it needs to determine the required animation for each Unicode codepoint of the text, or for any other element.

By way of example, consider an animation that flies a paragraph into place, by flying the individual words in from off-screen, with each word flying in on a line that goes through the center of the words final position and the center of the paragraph. Because the text animation effect runs after data binding and page layout has happened, the information required to compute the individual word vectors is available to the text animation effect.

The text animation effect is responsible for walking the tree and the layout results, and for adding character or glyph independent animation properties to the tree before rendering. In one implementation, the text animation effect will usually apply animation capable effects using a helper class provided in the above-described layered architecture.

The text animation effect implements a general AnimationEffect abstract class at this level, supporting animation of any element type, not just text. For example, in the above scenario, the text may include an inline icon or other graphic element. The text animation effect applies animation effects to that element, just as it applies character/glyph animation effects to text runs. Note that the text animation effect may derive from the same base class as other animation effects.

An example of text animation effect markup is set forth below:

```
<TextPanel>
    <TextPanel.AnimationEffects>
        <TextFlyIn ... />
    </TextPanel.AnimationEffects>
```

```
    <Text>
        Hello world.
    </Text>
</TextPanel>
```

A Character/Glyph animation property is usually, but not necessarily generated by the text animation effect above, and specifies, for an arbitrary inline run of Unicode codepoints, a set of animations to apply to the glyphs that will represent those codepoints. The following is one example implementation of the character/glyph animation properties:

```
public class TextEffect : Changeable
{
    // effects that can be applied on text
    // Position animation is supported through transform
    // opacity is supported through Brush
    Transform  transform;
    Geometry   clip;
    Brush      foreground;
    // Text specific properties.
    // Text Animation effect author can use a helper class to compute
    // the indices for them.
    TextEffectGranularity Granularity;
    int CharacterIndex;
    int glyphOffsetRelativeToCpStart;
    int Count;
}
public enum TextEffectGranularity
{
    Codepoint,
    Glyph
}
// This class will be exposed as a DependencyProperty on
// relevant UIElement and ContentElement, including <Text> <TextPanel>
// <Inline>, <Bold>, <Italic>, etc...
public class TextEffectCollection: Animatable, IList, IList<TextEffect>
{
}
```

Note that text animation properties are not inheritable in order to avoid the complexity of indexing among nested text containers. Further, specifying conflicting animations for the same piece of text may result in unintended behavior.

As described above, when setting an effect using an AnimationEffect object, it is often the situation that the text animation effect author will not know ahead of time what and where the exact text to animate is, e.g., when the text content comes from data binding. The author thus uses the text object model to locate the text dynamically, after layout, and apply the animation effects through the helper class. By way of example, to create a very simple text animation effect that animates the glyph clusters of the text inside a UIElement. Glyph cluster is a group of indivisible glyphs for rendering. A glyph cluster often corresponds to a character, but not always.

First, the class is inherited from AnimationEffect, so that the text animation effect is used in the same way as other animation effects. When AnimationEffect is added into UIElement's AnimationEffects dependency property, it will be automatically attached to that UIElement:

```
public MyTextAnimation : AnimationEffect
{
    protected override void AttachCore ( )
    {
```

```
            // Add to the list of active animation effects
            // to make sure DoWorkForFrame is executed.
            IsActive = true;
        }
}
public MyTextAnimation : AnimationEffect
{
        protected override void DoWorkForFrame ( )
        {
                // This function is called before rendering happens
                // here we get to the attached UIelement and insert
                // text effect through Text Object model.
        // get to the attached target
        UIElement element = this.Target;
        Text text = element as Text;
        // right now only supports <Text>
        if (text == null)
                return;
        // construct an text effect here
        TextEffect flyin = new TextEffect ( );
        // fill in stuff in flyin
        ...
        // Use the TextEffectResolver helper class to resolve
        // effects on the whole text range of the text content. A
        // list of text effect targets are returned.
        TextEffectTarget [] results = TextEffectResolver.Resolve(
                        text.ContentStart,
                        text.ContentEnd,
                        flyin
                    );
        for (int i = 0; i < results.Length; i++)
        {
                // start the texteffect
                results [i].Enable( );
        }
    }
}
```

Note that if a few characters are ligatured, they are animated as one unit, even though they are multiple characters, because a cluster is an indivisible rendering unit. However, the text animation effect author can use OpenType features to control ligation.

At this time, the author can use the text animation effect in markup:

```
<Text>
    <Text.AnimationEffects>
            <!- this attaches MyTextAnimation to the text element -->
            <MyTextAnimation ... >
    </Text.AnimationEffects>
            some text here....
</Text>
```

The following example describes how TextEffect is to be broken up when attaching to a TextRange with nested inline elements:

```
            <Text>
                abc <Bold> def </Bold>
            </Text>
```

The text range, "abc <Bold> def </Bold>", contains the nested inline element <Bold>. To animate "def" requires TextEffect to be directly set on the <Bold> element:

```
    <Text>
        abc
```

```
        <Bold>
            <Bold.TextEffects>
                <TextEffect CharacterIndex="4" Count="3" />
            </Bold.TextEffects>
                def
        </Bold>
    </Text>
```

Note that TextEffect is set on the scoping element of the text, and CharacterIndex is relative to the beginning of the text container. In the above example, it is the start of <Text> element; CharacterIndex is four (4) because there are four symbols ahead of character "d" (i.e., 'a' 'b' 'c' and '<Bold>'). It is consistent with the way that these symbols are fetched and drawn by the line layout system.

To summarize, an example sequence of actions for text animation effects begins at design time, where the author requests an animation by setting it as a property on an arbitrary element range or text range. Next, how the animation is named and parameterized is determined by the text animation effect at layout time, which is after data-binding, page layout, and line layout, but before rendering. The animation effect generates one or more character or glyph animation properties and attaches them to character runs in a layout tree. At rendering time, text rendering code checks for character/glyph animation properties as it generates GlyphRuns. Where a character/glyph property applies, separate GlyphRuns are generated for each run of glyphs having a distinct animation. Thus what ends up in the visual tree is a set of GlyphRun instructions, surrounded by conventional animation instructions. Whether animated or not, for hardware acceleration, each GlyphRun may be converted to an overscale grayscale opacity mask and cached in video memory. This mask is then blended (e.g., using the ClearType blend) in hardware. A full range of animations are available, and handled exactly as with any other primitive.

Figure 5:
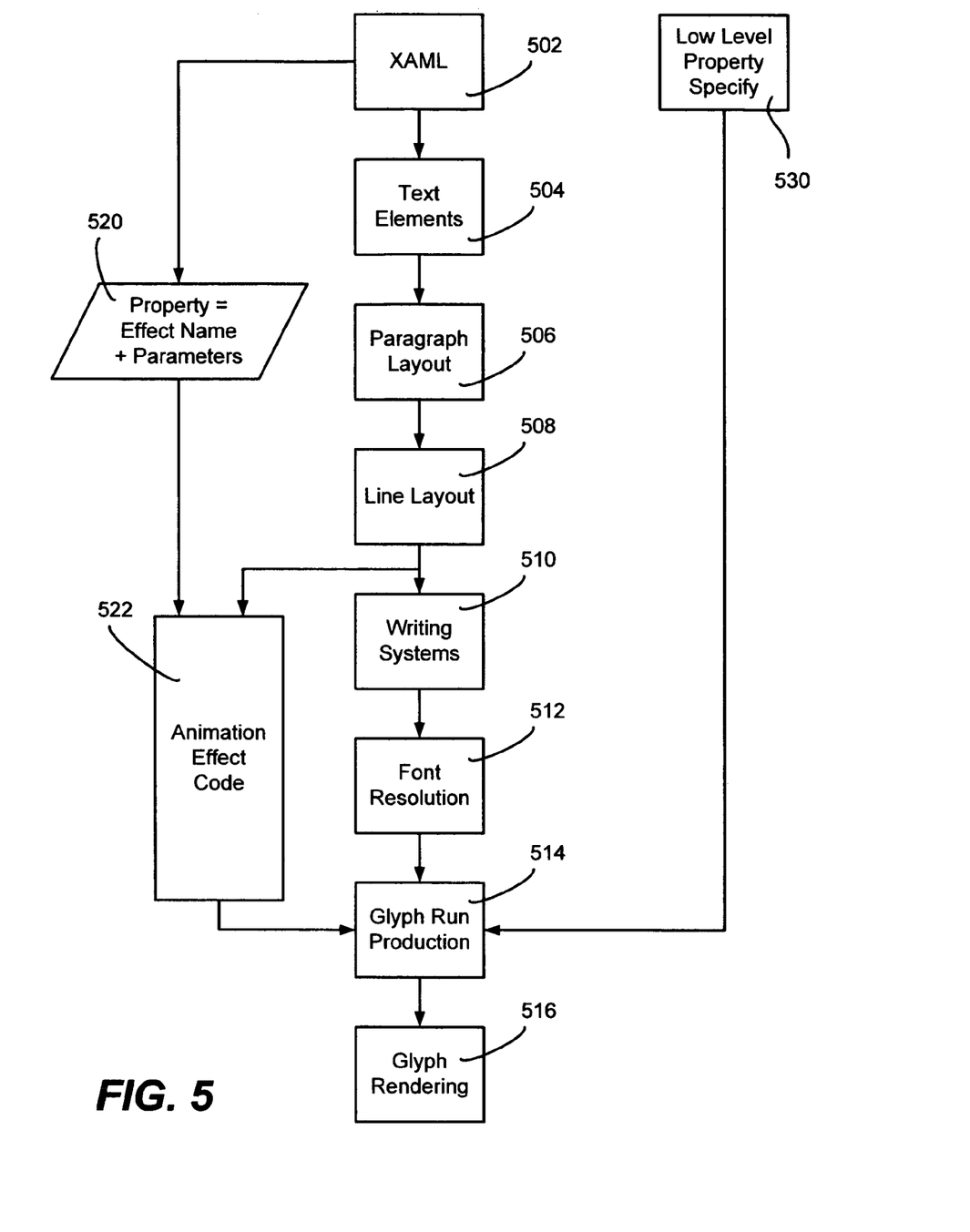
FIG. 5 is a block diagram representing a stack of text-handling components, configured to allow granular animation at the glyph level, in accordance with various aspects of the present invention.

Turning to FIG. 5, there is shown an example implementation of a stack for handling the layout and rendering of text. In general, in the stack, each component calls a lower level component until the actual glyph runs are produced for rendering. At the top of the stack, there may be some XAML code 502 or the like, which, as described above, may specify text, animations, animation programs and parameters, and/or databinding. Text elements 504, such as text flow or a text block, are also represented. These text elements 504 call paragraph layout code 506 to perform paragraph-level layout, which in turns calls line layout code 508 as necessary to layout lines of text within the paragraph to display.

More particularly, when the XAML 502 is interpreted, a parser generates a tree of elements, (or C# constructs the tree), and each element lays out its own part of text. If it is a text block element, the element calls paragraph layout to determine the number of lines, the text per line, and so forth. The paragraph layout in turn calls line layout, to determine things such as how characters fit, word breaking, and the like.

To make its determination, the line layout code 508 calls a writing system 510, for the purpose of handling language-dependent rules, such as rules for joining up text, laying out left-to-right or right-to-left, and so forth. The writing system 510 in turn calls font resolution handling code 512 for the specific font, which in turn calls glyph run production code 514 to produce the glyphs. When the glyph runs are complete, they may be rendered by glyph rendering code 516.

In keeping with the present invention, an animated transform may be pushed onto the stack before rendering the glyph run. One way is by directly specifying the text, as described above, which (e.g., "Hello") remains in a text object until separated into multiple glyph runs, as also described above.

Another way is by having the XAML or other high-level plug-in code specify a property 520, comprising an effect filename and its parameters, such as in the fly-in or bounce/spring examples described above. This property remains intact through the stack until after line layout, at which time the file's animation effect code 522 is called. This code inspects the results of the layout at this state, to determine appropriate per character or per glyph animations to produce low-level animation.

Note that in the above-described layer architecture, a property also may be specified at a lower-level, such as for per character or glyph animation, as represented in FIG. 5 by the block 530. The property is opaque to what it is attached to, that is, it makes it down to the glyph run production intact. If the property is an animation property, the glyph run is broken up as necessary, and an animation transform (or transforms) applied per character or per glyph based on the property. Thereafter, at rendering, each animation affects each glyph run to which it applies.

The following provides API support for text animation:

```
Public class TextEffectResolver
{
        public static TextEffectTarget [] Resolve(
                TextPointer start,
                TextPointer end,
                TextEffect   effect);
}
Resolve     Resolve the TextEffect onto the given text range.
            For each piece of continuous text, the resolver
            will calculate the character index and count of
            the continuous text and set the effect onto the
            scoping dependency object.
public class TextEffectTarget
{
    public DependencyObject Element{ get ; }
    public TextEffect       extEffect{get; }
    public bool IsEnabled   {get; }
    public void Enable( );
    public void Disable( );
}
Element     Retrieve the dependency object that the
            TextEffect is applying to.
TextEffect  Retrieve the text effect being applyed.
IsEnabled   Indicate whether this TextEffect is enabled, i.e.
            whether the target element's TextEffectsProperty
            DP contains this TextEffect.
Enable( )   Enable the text effect, i.e add the text effect
            into the TextEffectsProperty of the target
            element
Disable( )  Disable the text effect, i.e. remove the text
            effect from the TextEffectsProperty of the target
            element.
```

As can be seen from the foregoing detailed description, there is provided a method and system that allow text to be animated on a very granular level, such as individual characters or glyphs, without treating each character as a separate entity. Further, the text need not be known in advance, but can be obtained at runtime. The author may also apply reconfigured animation code to text.

While the invention is susceptible to various modifications and alternative constructions, certain illustrated embodiments thereof are shown in the drawings and have been described above in detail. It should be understood, however, that there is no intention to limit the invention to the specific forms disclosed, but on the contrary, the intention is to cover all modifications, alternative constructions, and equivalents falling within the spirit and scope of the invention.

What is claimed is:

1. In a computing environment, a method for individually animating text elements at an author-selected level of granularity, the method comprising:
   receiving information indicating that part of a text object model is to be animated, the part of the text object model to be animated at a user-definable granularity of text elements, and the part of the text object model to be animated comprising a set of consecutive text elements;
   subsequent to receiving the information indicating that part of the text object model is to be animated, identifying text to render;
   binding the identified text to the text object model;
   laying out the page containing the animated text elements;
   laying out the line containing the animated text elements;
   laying out the text object model by producing a glyph animation property for the part of the text object model to be animated and attaching the glyph animation property to a character run in a layout tree, the glyph animation property being associated with the part of the text object model to be animated and independent of actual text characters to be animated, a non animated part of the text object model being associated with a character run in the layout tree having no glyph animation property; and
   at rendering time, generating a separate glyph run for each run of glyphs having a distinct associated glyph animation property and applying the associated glyph animation property to each glyph run, and rendering each glyph run to a display device.

2. The method of claim 1 further comprising, receiving information indicating that a different part of the text object model is to be animated, and producing a different glyph animation property for the different part of the text object model.

3. The method of claim 1 wherein identifying text to render comprises obtaining the text dynamically, from a source external to a source of the information that indicates that part of the text object model is to be animated.

4. The method of claim 1 wherein producing a glyph animation property for the part of the text object model to animate comprises calling animation effect code identified with a source of the information that indicates that part of the text object model is to be animated.

5. The method of claim 1 wherein receiving the information indicating that part of the text object model is to be animated comprises interpreting markup.

6. The method of claim 1 wherein receiving the information indicating that part of the text object model is to be animated comprises interpreting markup, wherein obtaining the text to render comprises dynamically obtaining the text from a source external to the markup, and wherein producing a glyph animation property comprises calling code identified in the markup.

7. At least one computer-readable medium having computer-executable instructions, which when executed perform the method of claim 1.

8. In a computing environment, a system for individually animating text elements at an author-selected level of granularity, the system comprising:
   computer-readable media, wherein at least a portion of the computer-readable media is storage, non-communication type media, and wherein the computer-readable media has stored thereon:

a text object, the text object including a text element for containing text and having a property associated therewith indicating that part of the text of the text element is to be animated, the part of the text being selected at a user-definable granularity and the part of the text to be animated comprising a set of consecutive text elements;

a text handling stack, the text handling stack having a series of components wherein each component calls a lower level component until an actual glyph run is produced for rendering, the text handling stack components comprising;

a topmost component comprising a high level language that, when parsed, generates a tree of elements;

at least one layout component, wherein each element in the tree is capable of using the layout component to lay out its own part of the text; and    a glyph run production component, wherein the glyph run production component produces a glyph run for each element in the tree, the glyph run production component being at a lower level than the layout components; and means for associating animation information with the part of the text element that is to be animated, the animation information associated with the part of the text element that is to be animated being applied to a glyph run corresponding to the part of the text element that is to be animated during glyph run production by the glyph run production component.

9. The system of claim 8 wherein the animation information corresponds to an animation transform, the animation transform comprising at least one type of transform of a set containing, a movement-related transform, a rotation transform, a shear transform, a scale factor transform, a translation transform, a clip region transform, an appearance related transform, a color-related transform, and an opacity-related transform.

10. The system of claim 8 wherein the text to be animated corresponds to a glyph run representative of a set of at least one character or glyph.

11. The system of claim 8 wherein the means for associating the animation information with the part of the text element that is to be animated comprises a named set of executable code that accepts at least one parameter.

12. The system of claim 8 further comprising means for obtaining the property, and wherein the text is obtained dynamically, from a source external to the means for obtaining the property.

\* \* \* \* \*